Sept. 1, 1925.
J. T. TUCKER
1,551,713
INDIVIDUAL AUTOMOBILE FERRY
Filed Feb. 14, 1925
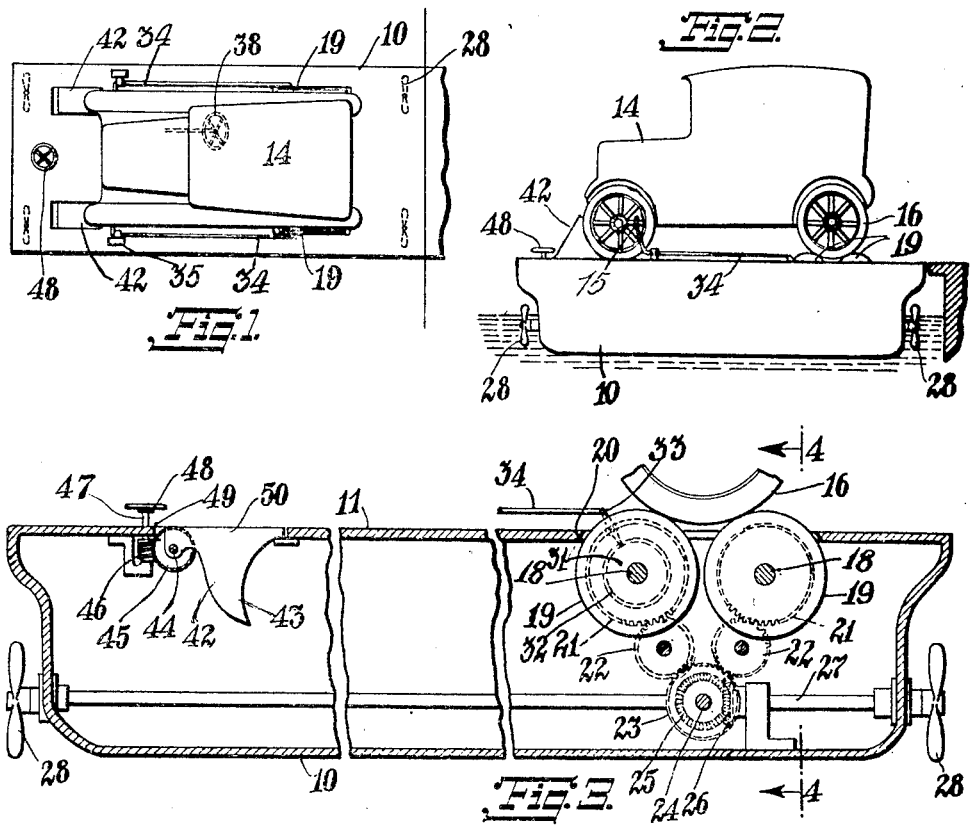
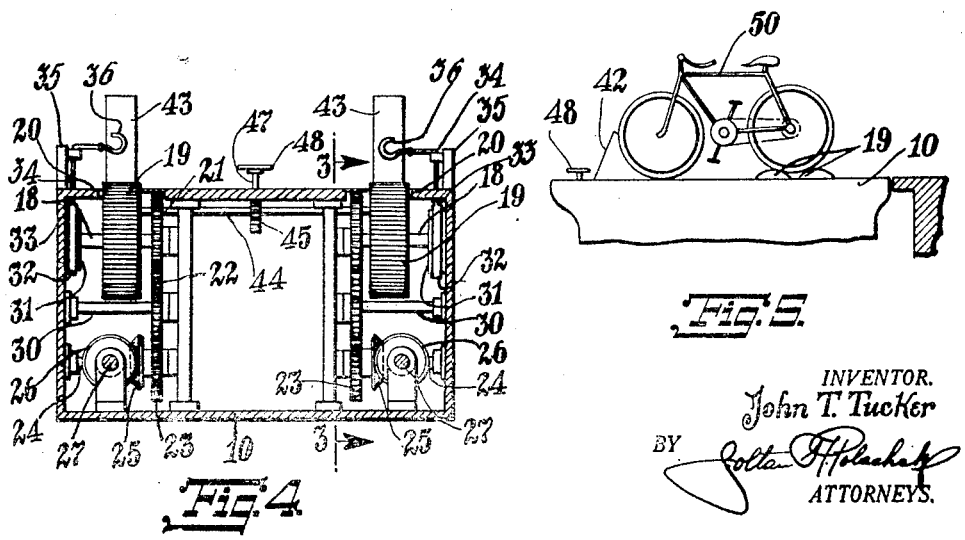
INVENTOR.
John T. Tucker
BY
ATTORNEYS.

Patented Sept. 1, 1925.

1,551,713

UNITED STATES PATENT OFFICE.

JOHN T. TUCKER, OF BROOKLYN, NEW YORK.

INDIVIDUAL AUTOMOBILE FERRY.

Application filed February 14, 1925. Serial No. 9,342.

*To all whom it may concern:*

Be it known that I, JOHN T. TUCKER, a citizen of the United States, residing at Brooklyn, in the county of Queens and State of New York, have invented certain new and useful Improvements in Individual Automobile Ferries, of which the following is a specification.

This invention relates to an automobile ferry, the invention having more particular reference to a ferry in the form of a scow or flat boat, which is propelled by power received from the automobile thereon, the invention having for an object the provision of a novel device of this sort by means of which automobiles may ferry themselves across a river under their own power on individual boats.

For further comprehension of the invention, and of the objects and advantages thereof, reference will be had to the following description and accompanying drawing, and to the appended claims in which the various novel features of the invention are more particularly set forth.

Fig. 1 of the drawing is a plan view showing a ferry boat constructed according to the invention, and having an automobile positioned thereon.

Fig. 2 is a side view thereof.

Fig. 3 is an enlarged longitudinal sectional view taken on the line 3—3 of Fig. 4.

Fig. 4 is a detail transverse sectional view taken on the line 4—4 of Fig. 3.

Fig. 5 is a similar view to Fig. 2, but showing a motorcycle positioned on the boat.

Referring now to the drawing, the reference numeral 10 indicates generally the hull of the boat, which is of scow form and has a platform 11 on the top thereof on which the automobile rests. The body of the automobile is indicated generally at 14, the front wheels at 15, and the rear wheels at 16. Extending transversely of the boat within the hull thereof and near the stern thereof, are two pairs of alined shafts 18. Each of these shafts has fixed thereon a transmission wheel 19 whose surface projects slightly above the surface of the platform, being accommodated in an opening 20 therein. When the automobile is in place on the boat the rear wheels thereof rest upon these transmission wheels, or drums 19, which latter may have corrugated faces as shown.

Each shaft 18 has fixed also thereon a gear 21 that meshes with an idler 22, these latter in turn meshing with another gear 23 on a transverse shaft 24 located under the shaft 18. Upon this shaft 24 is a bevel gear 25 that meshes with a like gear 26 on a longitudinal shaft 27 that extends completely through the boat to project at its ends therefrom, the projecting ends of the shaft having ordinary helical propellers 28 thereon; there being a pair of these shafts 27, as will be understood. The forward pair of shafts 18 project from the hull at the sides thereof and have brake drums 31 fixed on their outer ends. These drums are adapted to be engaged by bands 32 that are operated by means of levers 33 having wires 34 connected at one end thereto, these wires leading along the sides of the boat and upward along posts 35 on the sides of the platform 11 and are provided on their other ends with hooks 36 which may be engaged with spokes on the front wheels of the automobile. Suitable guide pulleys and hooks are provided for the wires 34. As will be understood, the differential gear of the automobile permits of independent movement of the two rear wheels thereof, so that if one of the brake bands is tightened the drive will be transmitted only to the propeller on the opposite side of the boat, the propeller and its drive connections on the adjacent side of the boat being locked against movement by the brake.

In order to prevent the automobile from moving forward a suitable abutment for the front end thereof is needed and said abutment might be provided by jacking up the front end of the automobile, or it may be provided by novel means comprising a pair of arms 42 having arcuate outer or free ends 43 and which are fixed on a transverse shaft 44 to which is also fixed a worm gear 45 engaged by a worm pinion 46 on a short vertical shaft 47 that projects upward through the platform 11 and has a handwheel 48 on its upper end. These arms 42 are accommodated in openings 49 in the platform 11 and are provided with flat faces 50 along one side that are normally flush with the platform and thereby cover the said openings.

As shown in Fig. 5 of the drawing, the ferry may also be used for a motorcycle 50, the brake wires being connected to the steering shaft of the latter similarly to their connection to the steering shaft of the automobile.

The device as here shown is single ended, the automobile being backed onto the boat, which has one end against the wharf or float, and which may be tied to the latter by the usual ropes not shown, the boat being turned around after backing out. The device might also be made double ended, with a pair of the transmission wheels adjacent each end thereof.

Having thus described my invention, what I claim as new and desire to protect by Letters Patent of the United States is as follows:

1. An automobile ferry comprising a boat having a platform on the top thereof, a pair of transmission wheels mounted in the hull of the boat and projecting at their top edges through openings in the said platform and adapted to have the rear wheels of the automobile rest thereon, a pair of propeller shafts extending longitudinally through the boat hull and projecting at their ends therefrom, propellers fixed on the said projecting ends, and drive connections between the said transmission wheels and the said shafts.

2. An automobile ferry comprising a boat having a platform on the top thereof, a transmission wheel projecting at its top edge through the said platform, a propeller, and drive connections between the said wheel and the said propeller, and movable abutments on said boat for the front wheels of the automobile, said abutments consisting of arms pivotally connected to the boat hull, and having arcuate free ends, said arms presenting one side flat faces normally lying flush with the top face of the said platform.

In testimony whereof I have affixed my signature.

JOHN T. TUCKER.